United States Patent [19]

Smith

[11] Patent Number: 5,217,191

[45] Date of Patent: Jun. 8, 1993

[54] PIPE HANGERS OR THE LIKE

[76] Inventor: Robert L. Smith, Odessa, Tex.

[21] Appl. No.: 916,279

[22] Filed: Jul. 21, 1992

[51] Int. Cl.$^5$ .............................................. F16L 3/16
[52] U.S. Cl. .............................................. 248/55; 248/49
[58] Field of Search ...................... 248/49, 55, 74.1, 65, 248/68.1, 70

[56] References Cited

U.S. PATENT DOCUMENTS

| | | | |
|---|---|---|---|
| 1,541,129 | 6/1925 | Farley | 248/55 |
| 2,106,956 | 2/1938 | Nakamura | 248/55 X |
| 3,138,659 | 6/1964 | Cognet | 248/49 X |
| 3,576,304 | 4/1971 | Gillemot | 248/74.2 |
| 4,502,653 | 3/1985 | Curtis | 248/68.1 X |

FOREIGN PATENT DOCUMENTS 746731  3/1956  United Kingdom ................. 248/49

OTHER PUBLICATIONS

"Modern Hanger Corporation Catalog", published in 1953.

*Primary Examiner*—J. Franklin Foss
*Attorney, Agent, or Firm*—Robert C. Peterson

[57] ABSTRACT

A system of pipe hangers or the like for supporting various fluid bearing pipes and conduits which are exposed to the elements and extend along the rooftops of buildings. The hangers include a foundation of pre-cast reinforced concrete using reinforcing bars and tubular goods. The concrete base is seated on an isolation pad which is adhered to the roof without the use of nails or other fasteners penetrating the roof. The concrete base includes tubular inserts cast in the base which provide ready assembly of the bracket supporting the yoke and roller portion of the yoke pedestal or the studs for yokeless pedestal. The pipe hangers are adjustable to accommodate the need for leveling and weight distribution for equalizing the roof loading. In another embodiment, the pipe hangers include brackets for supporting accessories such as conduits and clamps.

20 Claims, 3 Drawing Sheets

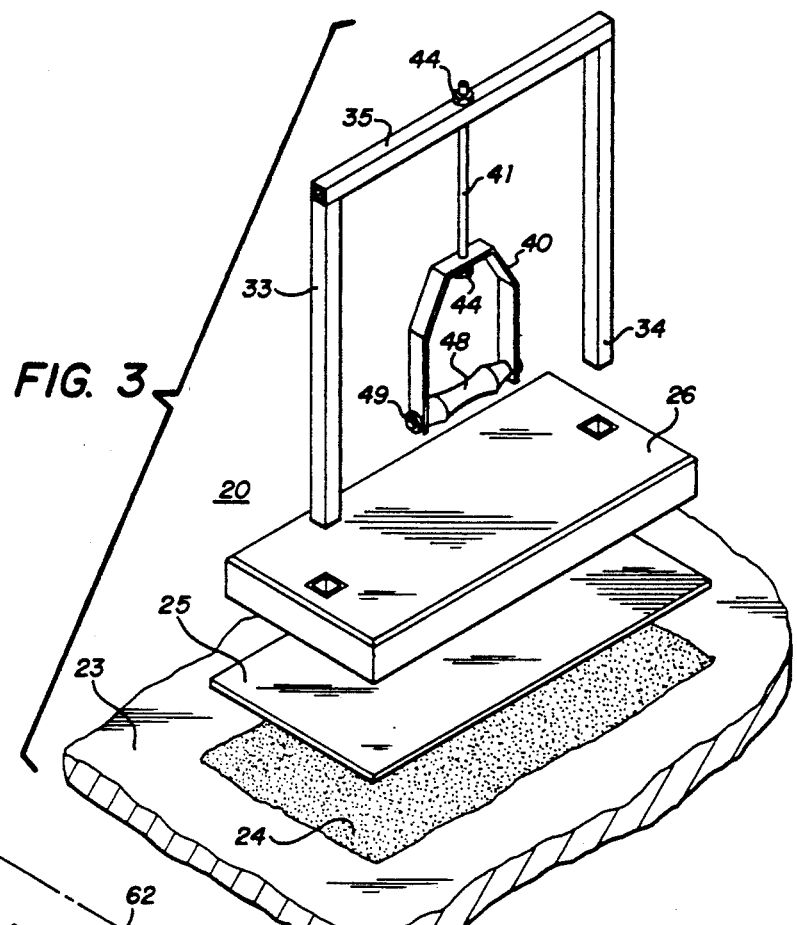
FIG. 3
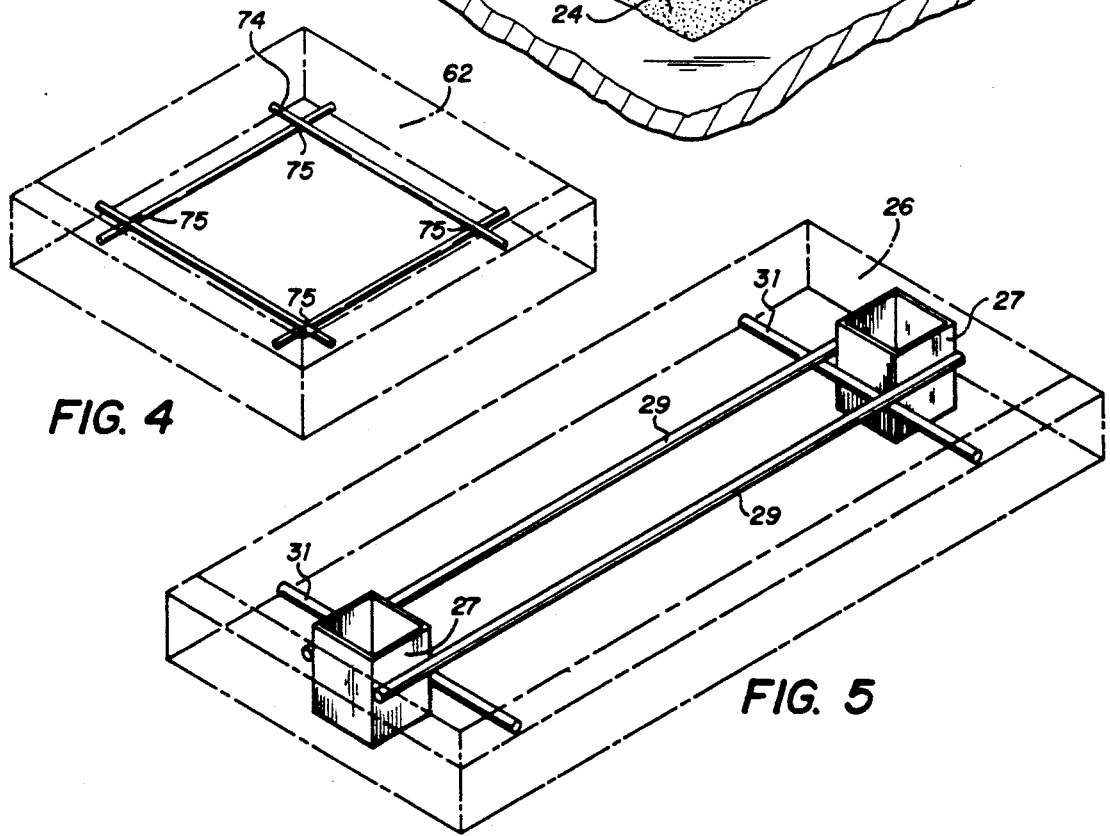
FIG. 4
FIG. 5

PIPE HANGERS OR THE LIKE

BACKGROUND OF THE INVENTION

This invention is in the field of supports for exterior pipes on building roofs or the like.

It is very common in commercial buildings for there to be various types of pipes and conduits which are exposed to the elements and extend along the top of the roofs of such buildings. These pipes and conduits may be connected to air conditioning units mounted on the building roof or to various other service units.

It is currently common practice for these pipes to be supported above the roof surface at intervals along their length by placing blocks of wood between the roof surface and the pipes. With temperature changes, the pipes expand and contract and, partly because of the large contact surface area between a block and the pipe, the block moves with the pipe. After a period of time, the movement of the block against the roof with the weight of the pipe thereon causes damage to the roof, which usually results in a leak and requires expensive roof repair. Even where the blocks are nailed down to the roof, the nails and the wood usually deteriorate in a relatively short time period so that the blocks break loose. Further, wood blocks are difficult to seal so the roof usually leaks about these nail holes.

There is currently available a pipe holder which is mounted on a roof and has a shaft mounted pulley or roller on which the pipe rests and rolls as it expands and contracts. While this prevents problems due to contraction and expansion of the pipes, it is necessary that holes be made in the roof for mounting purposes, and the device is expensive. Where many holders are required, they can easily cost more than a number of later roof repairs. Thus, that roller solution to the problem has not achieved a great deal of commercial success.

There has recently been developed an improved pipe-supporting device which has a substantially flat bottomed base with pipe supporting structure rising from the base that substantially equally distributes the weight of the pipe over the bottom of the base and thus over the area of the roof in contact with the base. The pipe supporting structure has a substantially V recess having divergent line contacts for receiving and supporting the pipe above the base. In this manner, the pipe is supported in the V with two contact points. This provides for easy sliding movement of the pipe within the support as the pipe expands or contracts. This pipe supporting device is disclosed in application for U.S. Letters Patent Ser. No. 438,735, filed Nov. 3, 1982, mentioned in and assigned to the same entity as U.S. Pat. No. 4,502,653.

While the pipe-supporting device of the application just referred to is a significant improvement over the prior art, it has been found that the resistance to pipe movement with respect to the supporting device may be further lessened and the device thereby significantly improved by the use of inexpensive plastic rollers which fit into and rotate in receiving troughs.

While various techniques have been developed to support pipes on building roofs, they are still subject to weather and the hazards of heat and cold which cause plastic parts to soften or deform under heat and become brittle in the cold and eventually will not last for extended periods of time. Furthermore, pipe contraction and expansion can cause damage to a roof where pipes are not permitted to freely move relative to the support from the roof or over time deteriorate and stress the supports causing movement.

SUMMARY OF THE INVENTION

The present invention provides a support base or pedestal suspending pipes in a yoke or supporting pipes from a roller bracket. The support pedestal comprises reinforced concrete blocks with inserts susceptible to securing pipe supporting brackets releasably or conduit securing brackets.

In one embodiment a reinforced pre-cast concrete block includes iron rebar and square steel tubing with the square steel tubing providing a pair of sockets or cavities for seating pipe hanger bracket. This would include an overhead adjustable hanger to support a pipe at an adjustable height above the roof. The reinforced pre-cast concrete block is seated on an isolation pad or foot pad such as is available from Manville under the trade name J-Walk which is an asphalt and organic felt pad. The felt pad is secured to the roof with an adhesive and no puncture of the roof surface is required.

In another embodiment of the invention, the reinforced concrete block includes welded wire mesh for strengthening the pre-cast block and includes plastic inserts to accommodate studs or ends of the roller bracket. Also a plastic insert, such as a polyethylene tube, is inserted in the pre-cast concrete to accommodate self tapping sheet metal screws for attaching utility type brackets which may be used for securing conduit and the like.

It will be appreciated that the invention provides a pre-cast reinforced concrete block for spacing along a roof to accommodate support brackets which may be readily assembled on the roof and customized at the job site for the particular requirements of the job. The supports for the pipe networks are provided with adjusting features, whether they are yoke suspension frames or yokeless supports. Likewise the accessory bar or channel for supporting clamps for accessories, such as conduit or cables, are readily secured by screws into the plastic insert provided in the pre-cast concrete pads and are adjustable along the accessory bar or channel.

DESCRIPTION OF THE DRAWINGS

The accompanying drawings illustrate various features of the invention:

FIG. 3 is an expanded view of the pedestal of FIG. 2 illustrating a segment of the roof, adhesive, the isolation pad, the concrete reinforced base and the overhead yoke;

FIG. 4 illustrates the reinforcing bars in a phantom view of the square base for the pipe pedestal;

FIG. 5 illustrates square steel tube with rebars welded thereto in a phantom view of the heavy duty or large base for the pipe pedestal;

DETAILED DESCRIPTION OF THE PREFERRED EMBODIMENT

Figure 1:
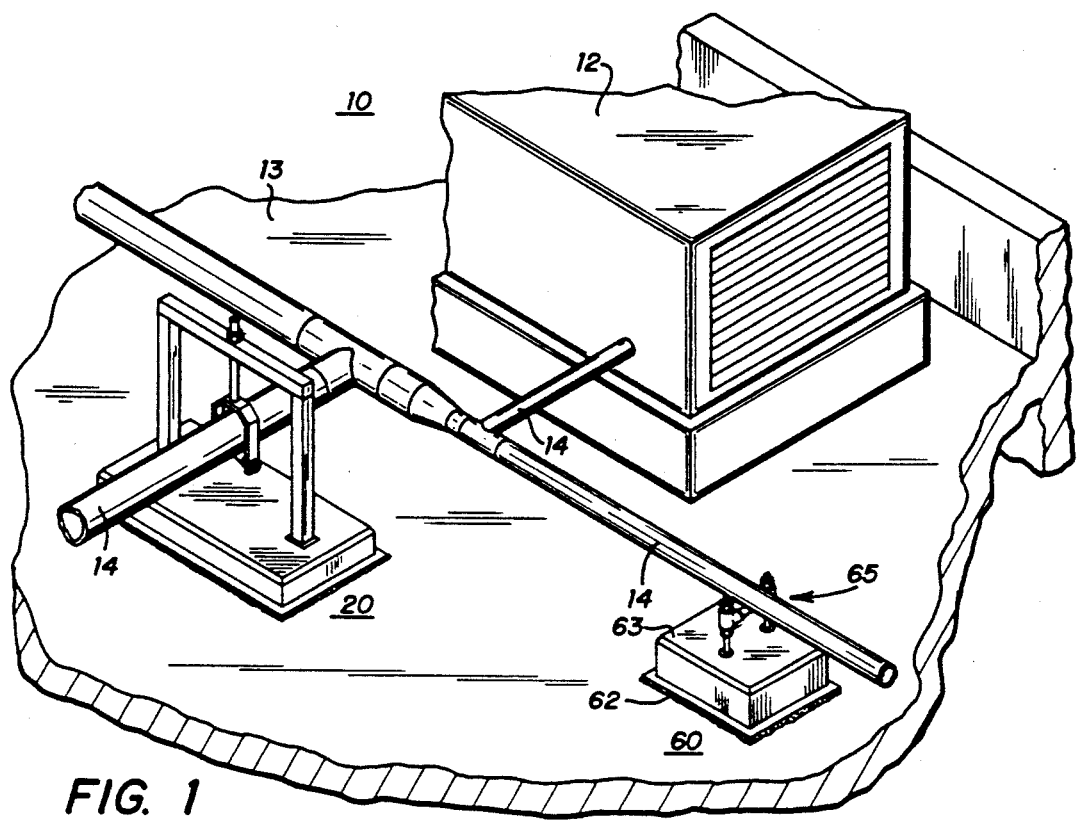
FIG. 1 illustrates a partial roof segment with installation of piping using the inventive pedestals.

With reference to FIG. 1, roof installation 10 includes air conditioner 12 seated or mounted on roof section 13. For providing service to the air conditioner 12 and other similar units on the roof (not shown), a pipe network 14 is provided and utilizes yoke pipe support pedestal 20 and yokeless pipe support pedestal 60, both of which will be discussed further herein.

Figure 2:
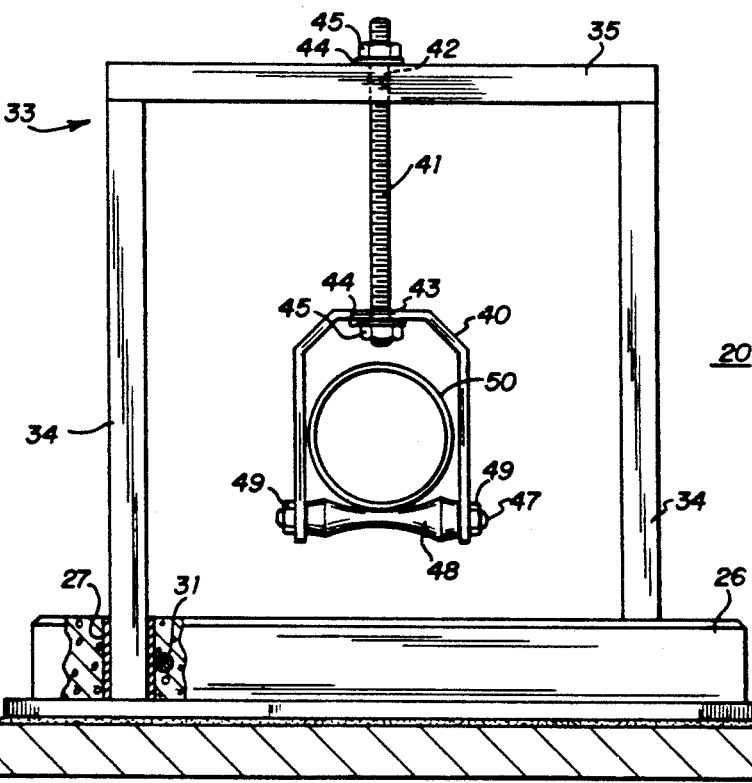
FIG. 2 is a side elevation view of the one pedestal having an overhead yoke support with a section through the roof and the precast concrete/base broken away to expose the steel tubing and reinforcing bar.

Referring now to FIGS. 2, 3 and 5, the details of the yoke pipe support pedestal 20 will be described. Referring specifically to FIG. 3, yoke pedestal 20 is illustrated in an exploded view of its components and attachment to the roof section 23. The roof section 23 has an adhesive 24 applied to a clean place on the roof section 23 and foot pad 25 is placed on the adhesive 24 to secure it to the roof section 23. Concrete base 26 is then seated on the foot pad 25. The base is of sufficient mass that it uniformly compresses the isolation or foot pad 25 and will remain in place without further attachment to the roof. Referring to FIG. 5, the concrete base 26 showed in phantom has two tubular steel inserts 27 which are spaced apart and held in position by longitudinal reinforcing rebars 29 welded to the outer surface of tubular steel inserts 27 and are spaced in an approximately central plane running through the concrete base 26. In addition, lateral rebars 31 are welded to inward-facing sides of the spaced tubular inserts 27. Also rebars 31 and 29 are so positioned to be welded to each other. Thus rebars 29 retain the spacing of tubular inserts 27 reinforce the concrete base 26. Pedestal 20 has a bracket 33 which comprises a pair of side posts 34 and cross bar 35. Referring to FIG. 2, the pedestal 20 is illustrated with a broken away section through one tubular steel insert 27 illustrating that side post 34 of yoke support bracket 33 seats in tubular insert 27 and rests on foot pad 25.

Yoke bracket 40 is suspended from cross bar 35 of yoke support bracket 33 by a threaded rod 41. Extending through hole 42 in cross bar 35 and hole 43 in yoke 40. One end to threaded rod 41 is secured to the yoke 40 by washers 44 and nuts 45 and the other end of threaded rod 41 is secured to the cross bar 35 with washers 44 and nuts 45. A conventional pipe support roller 48 is secured through holes 46 in yoke 40 by nuts 49 on threaded rod 47 which retains the pipe support roller 48, yet permits free rotation thereof corresponding to movement of pipe 50 which is supported from roller 48. It will be understood that nuts 45 on threaded rod 41 may be adjusted to raise or lower the roller 48 of yoke 40 and thus adjust for leveling pipe 50 on the roof such as in FIG. 1 to equalize and distribute the pipe load throughout the pipe support system.

Figure 6:
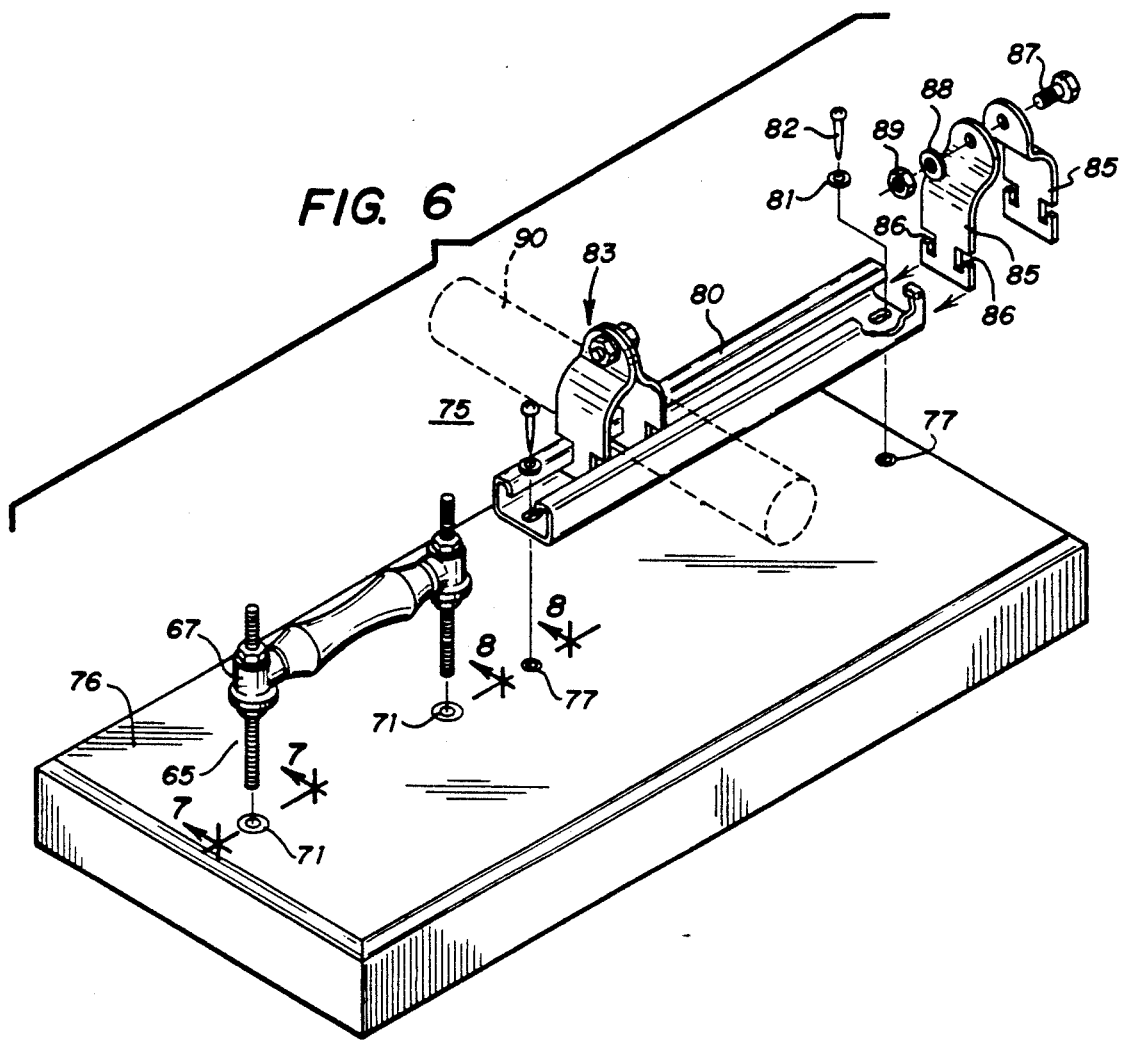
FIG. 6 illustrates a double base of that shown in FIG. 4 with the yokeless and accessory mount in an exploded view.
Figure 7:
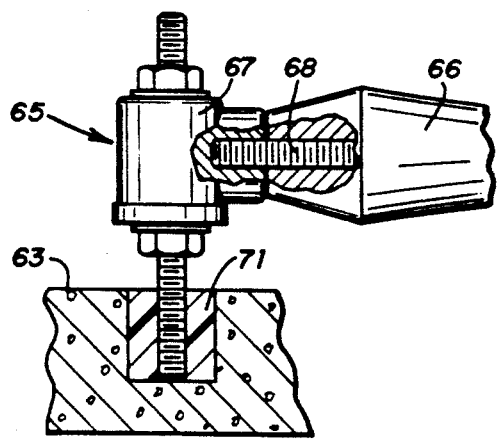
FIG. 7 illustrates the detail of the support for the yokeless pipe roller on the base of the yokeless pedestal.
Figure 8:
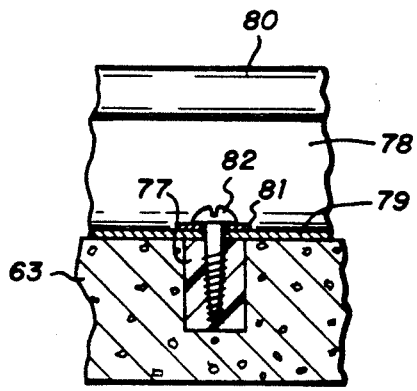
FIG. 8 illustrates the details of the mounting of the accessory bar using an insert tube and self-tapping screw on the base of the yokeless pedestal and accessory mount.

Referring now to FIGS. 1, 4, 6, 7 and 8, and in particular FIGS. 1 and 4, which illustrate a single base yokeless pedestal 60 which is mounted on roof section 13 in the same manner as yoke pedestal 20. Thus it will be understood that yokeless pedestal 60 is seated on foot pad 62 which is secured to the roof section 13 by adhesive applied to a clean surface thereon, and reinforced concrete base 63 is then seated on foot pad 62. The pipe roller bracket 65 of yokeless pedestal 60 includes a pipe roller 66 secured about threaded support rod 68 at each end by roller mounts 67 which are adjustably secured above concrete base 63. One end of threaded stud 70 is seated in plastic cups 71 which is embedded in reinforced concrete base 63. It is unnecessary for this end of stud 70 to be threaded as the weight of the pipe roller bracket 65 and the pipe thereon maintain the seating. As illustrated in FIG. 7, plastic cup 71 extends approximately half the depth of the concrete base 63. Washers 72 and nuts 73 hold roller mount 67 in position and may be adjusted as required to equalize the load of pipes carried on single yokeless pedestal 60. The just described assembly for pipe roller bracket 65 and its mounting is utilized for mounting similar yokeless pedestal roller brackets. FIG. 4 illustrates that the wire reinforcing mesh 74 consists of wires welded together at welds 75, thus providing reinforcing for concrete base 63 shown in phantom.

Now referring to FIG. 6, yokeless pedestal and accessory mount 75 has a pipe roller bracket 65 mounted on one side as just described in connection with FIGS. 1 and 7. Also in FIG. 6 there is illustrated yokeless pedestal and accessory mount 75 having a concrete base 76 with cup insert 71 and tubular plastic insert 77. The same wire reinforcing is used in the double concrete base 76 as concrete base 63. In this particular embodiment, pedestal 75 has the same pipe roller bracket 65 as shown in FIG. 1, and mounting accessory bracket 78 to be described.

Accessory bracket or channel 78 includes spaced apart holes or apertures 79 and inwardly opposed lips 80 which form a rail or track. The accessory bar or channel 78 is secured to the yokeless pedestal and accessory mount 75 in tubular plastic inserts 77 with washers 81 seated over apertures 79 and self-tapping screws 82 threaded into tubular inserts 77. As viewed in FIG. 6, accessory bar 78 has a conduit holding assembly 83 securing phantom conduit 90. The holding assembly includes a pair of arcuate struts 85 with notches 86 therein which fit over the track formed by opposed lips 80 of the accessory bracket 78. A conduit, such as shown in phantom at 90, would be secured between facing arcuate struts 85 mounted upon the track formed by inwardly opposed lips 80 by notches 86 and secured between opposing arcuate struts 85 by screw head bolt 87, washer 88 and nut 89.

The invention disclosed herein is illustrated and described with specific reference to embodiments thereof presently contemplated as the best mode for carrying out the invention. However, it should be understood that various materials of construction other than those described herein which perform the same function may be utilized. It should be understood that various changes may be made in adapting the invention to different embodiments without departing from the broader inventive concepts disclosed herein and set forth in the claims that follow.

I claim:

1. In a pipe and accessory mounting system for a roof including pipe supports and accessory conduit mounts, the improvement comprising the combination of:
    at least two spaced apart reinforced base means each having one or more reinforcing elements therein, and each having at least a pair of spaced apart cavities therein formed by smooth wall tubular inserts;
    a foot pad beneath each reinforced base means adhered to the roof by an adhesive for removably placing said reinforced base means on said roof;

adjustable bracket means seated within said pair of spaced apart cavities of each reinforced base means, said bracket means having a roller for supporting a pipe while permitting axial expansion or contraction of said pipe and equalizing the weight distribution of said pipe upon each reinforced base means.

2. The pipe and accessory mounting system of claim 1 wherein each said reinforced base means includes at least two pairs of spaced apart cavities and an accessory bracket means supported from said reinforced base means in one pair of said spaced apart cavities for retaining conduit and other accessories.

3. The pipe and accessory mounting system of claim wherein said reinforced base means are of concrete and said reinforcing elements are iron rebars.

4. The pipe and accessory mounting system of claim 3 wherein said tubular inserts are tubular steel.

5. The pipe and accessory mounting system of claim 1 wherein the adjustable bracket means has an overhead yoke support bracket for adjustably supporting said roller above said reinforced base means.

6. In a pipe support system for a roof, a pipe and accessory support pedestal comprising:
 a reinforced base means of sufficient mass to resist movement relative to the roof having at least a pair of spaced apart reinforcing elements therein and at least a pair of spaced apart smooth wall cavities therein;
 a weather resistant pad beneath said reinforced base means adhered to the roof by an adhesive for seating said reinforced base means on said roof;
 a bracket means retained within said cavities and extending above said reinforced base means, said bracket means having a roller for supporting a pipe at an adjustable height thereover for equalizing the weight distribution of pipe upon the roof and allowing free axial movement of a pipe supported by the roller of said bracket means.

7. The pipe and accessory support pedestal of claim 6 wherein said reinforced base means comprises a concrete base and wherein said reinforcing elements are iron rebars.

8. The pipe and accessory support pedestal of claim 7 wherein said cavities are defined by tubular steel inserts.

9. The pipe and accessory support pedestal of claim 6 wherein said reinforced base means has at least two pairs of spaced apart cavities and includes an accessory bracket means secured to said reinforced base means in one pair of said spaced apart cavities for retaining other accessories.

10. The pipe and accessory support pedestal of claim 9 wherein said reinforced base means comprises a concrete base and said reinforcing elements are iron rebars.

11. The pipe and accessory support pedestal of claim 10 wherein at least one of said spaced apart cavities are formed by tubular steel inserts.

12. The method of supporting pipes and accessories from a roof comprising the steps of:
 adhering at least two isolation pads to the surface of a roof at spaced apart intervals therealong;
 seating reinforced base means each having at least a pair of spaced apart cavities therein on each spaced apart isolation pad;
 placing bracket means having a roller support for a pipe within said pairs of spaced apart cavities of each reinforced base means;
 positioning said pipes upon the rollers of said bracket means and thereafter adjusting said bracket means to equalize the weight distribution of said pipe among each of the reinforced base means on the roof.

13. The method of claim 12 wherein said reinforced base means includes iron rebars and said spaced part cavities are formed by tubular steel inserts.

14. The method of claim 12, including the step of seating reinforced base means each having at least two pairs of spaced apart cavities therein on each said isolation pad, mounting an accessory bracket within one pair of said spaced apart cavities and securing an accessory member to said accessory bracket.

15. The method of claim 14 wherein said reinforced base means includes iron rebars and one pair of said spaced apart cavities is formed by two plastic inserts.

16. In a pipe and accessory mounting system for a roof including pipe supports and accessory conduit mounts, the improvement comprising in combination:
 a series of spaced apart isolation pads fixed to the roof by an adhesive,
 a reinforced base means seated on each of said pads, said reinforced base means having at least a pair of spaced apart smooth wall cavities therein forming footing sockets,
 bracket means having a pair of members seated in said footing sockets and supporting a pipe roller therebetween at an adjustable height above said reinforced base means.

17. The pipe and accessory mounting system for a roof of claim 16 wherein said reinforced base means includes at least an additional pair of spaced apart smooth wall cavities and includes an accessory bracket means attached in said additional pair of spaced apart smooth wall cavities.

18. The pipe and accessory support pedestal of claim 17 wherein said reinforced base means comprises a concrete base and said reinforcing elements are iron rebars.

19. The pipe and accessory support pedestal of claim 18 wherein at least one of said pair of spaced apart cavities are formed by tubular steel inserts.

20. The pipe and accessory mounting system of claim 19 wherein said additional pair of said spaced apart smooth wall cavities include plastic inserts for securing said accessory bracket means.

* * * * *